United States Patent Office 2,922,603
Patented Jan. 26, 1960

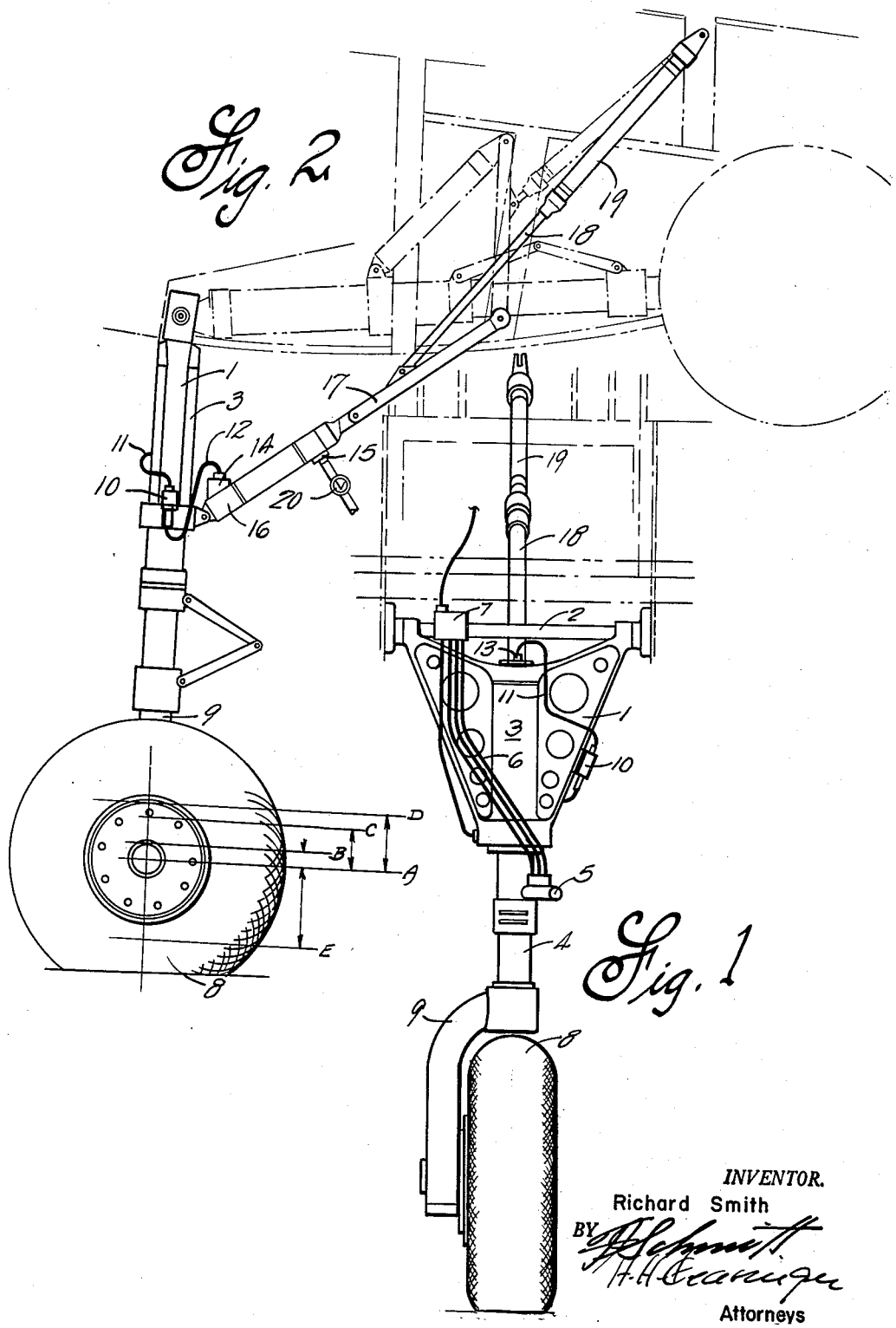

2,922,603

TWO POSITION LANDING GEAR

Richard Smith, Milford, Conn., assignor, by mesne assignments, to the United States of America as represented by the Secretary of the Navy Application February 13, 1956, Serial No. 565,277

1 Claim. (Cl. 244—102)

This invention relates to landing gear equipment with particular reference to means for modifying a conventional landing unit to reduce its overall length.

The use of various types of aircraft such as helicopters has been extended to a tremendous degree as is well known. However, what is not so well known is that the use of such equipment is sometimes limited because of storage problems with existing facilities. As an illustration, it is a general rule on aircraft carriers to design everything in as compact a manner as possible. Helicopters on the other hand have a certain height which is necessary because of the rotating blades being overhead. Consequently, the storage of such planes has been limited because of this fixed height coming dangerously close to the height of the storage capacities within the carriers. Thus the unit of the instant invention has been devised to allow such planes to be stored with more ease than present storage facilities permit.

The object of this invention therefore is a device on landing equipment which reduces the overall length of such equipment during certain phases of the equipment's operation.

A further object of this invention is a device which permits the landing gear to be maintained at either of two positions depending upon the results desired.

These and other objects and advantages will become evident from an examination of the following specification wherein:

Figure 1 shows an elevation view of the invention in conjunction with the landing wheel, and Figure 2 is a side view of Figure 1.

The brace 1 in the figures is shown as supporting the oleo strut housing 3. At the lower portion of the strut are located the necessary hydraulic control mechanisms 5, 6, 7 as is well known. One end of shaft 4 extends into the strut housing and together with the housing and control mechanism forms the oleo strut; the other end is attached to the landing wheel 8 thereby imparting the dampening action of the strut to the wheel.

Drag strut 16 extends from a mid-section of the strut 3 and provides a means for bracing the main strut 3 and also retracts the entire landing wheel unit to its retracted or normal flying position via a second drag strut 17 and the retracting mechanism 18, 19.

Strut 16 is made of tubular form and closed off at each end to thereby create an internal reservoir. At one end of the reservoir is attached a hydraulic fitting 14 leading to a control valve 10 via conduit 12; at the other end of the reservoir a fitting 15 is attached thereto, which fitting is connected to a source of compressed gas, such as air. The gas, to and from the reservoir, is controlled by any conventional type valve (as shown) in the lines.

The opposite end of valve 10 is connected to a fitting 13 in the upper section of the oleo strut via conduit 11. Associated with the strut is the conventional piston and valve arrangement internally of the housing 3.

In the static position of the aircraft, the position of the center of the wheel is at A while the normally operating compressed position is at B. During a landing operation, the center of the wheel can extend to point D, i.e. in the position where the oleo is fully compressed. After landing, the plane is ready to be stowed away; valve 10 is opened, the compressed air pressure in the reservoir of strut 16 is released and the strut 4 further enters the housing 3 by forcing the hydraulic fluid from the upper end of the housing 3 into the strut 16. It is of course understood that the strut 4 terminates into a piston in the upper secion of the oleo strut housing. With the removal of this hydraulic fluid, the normal stowed position is changed from B to C, thereby allowing additional head room for the helicopter in its storage compartment equal to the distance B—C. In the actual design of the unit, the distance B—C saved by such retraction of the wheel and strut 4 was ½ foot. This distance may be varied within limitations depending upon individual design requirements by changing the amount of oil removed into the drag strut.

For further use of the aircraft, the plane takes off from this retracted or stowed position. Once airborne, the weight of the wheel re-extends strut 4 to its normal operating position A. Valve 20 is opened to the source of compressed air, which air enters the reservoir within the strut 16 and forces the return of fluid to the top of the oleo strut 3 via the valve 10. The valve is then closed placing the wheel and the entire oleo strut in landing position to obtain the maximum cushioning effect of the terrific impact of the airplane upon landing.

When the wheel is retracted into the fuselage during flight, the wheel and strut 4 extend to position E; however, upon extension of the wheel into a landing position, the wheel and strut extend into their landing positions as shown.

Obviously many modifications and variations of the present invention are possible in the light of the above teachings. It is therefore to be understood that within the scope of the appended claim the invention may be practiced otherwise than as specifically described.

What is claimed is:

In an aircraft having a wheel, an oleo strut including a cylinder and a piston, said cylinder being pivotally secured to said aircraft and said piston having means extending through said cylinder adapted for receiving wheel supporting means, said cylinder providing a hydraulic fluid chamber above said piston, a drag strut assembly including two struts pivotally linked together so that they can be folded or extended, one of the struts of said drag strut assembly being pivotally connected to said aircraft and the other being pivotally connected to said oleo strut so that said oleo strut is retracted when said struts of said drag strut assembly are in a folded position and braced when said struts of said drag strut assembly are in an extended position, one of said struts of said drag strut assembly being a hollow cylinder closed at its ends providing a fluid reservoir therein, fluid passage means communicatively connecting said hydraulic fluid chamber to said fluid reservoir together for passage of fluid between them, fluid flow control means in said fluid passage means for restricting fluid flow therethrough, a source of compressed air communicatively connected to said fluid reservoir for introducing a compressed air force into said reservoir so that hydraulic fluid is forced from said reservoir into said hydraulic fluid chamber and said oleo strut is thereby extended and capable of being retained in said extended position without use of compressed air force by actuation of said fluid control means to prevent return of the hydraulic fluid to said reservoir and the length of said oleo strut being capable of being reduced by further actuation of said fluid control means permitting hydraulic fluid to leave said chamber and enter said reservoir.

References Cited in the file of this patent

UNITED STATES PATENTS

| | | |
|---|---|---|
| 2,186,266 | Onions | Jan. 9, 1940 |
| 2,554,581 | Levy | May 29, 1951 |
| 2,735,634 | Fosness | Feb. 21, 1956 |

FOREIGN PATENTS

| | | |
|---|---|---|
| 585,896 | Great Britain | Feb. 27, 1947 |